United States Patent [19]

Jahn

[11] 3,917,884

[45] Nov. 4, 1975

[54] METHOD OF MAKING WOUND GRAPHITE CARBON BODY

[75] Inventor: Paul F. Jahn, Chelmsford, Mass.

[73] Assignee: Fiber Materials, Inc., Biddeford, Maine

[22] Filed: Apr. 23, 1973

[21] Appl. No.: 353,500

[52] U.S. Cl. .................. 427/228; 264/29; 423/445; 423/447; 427/289
[51] Int. Cl.² .......................................... B05D 3/02
[58] Field of Search .......... 117/46 CC, 46 CB, 65.2; 264/29; 423/445, 447; 447/228, 289

[56] References Cited
UNITED STATES PATENTS

| | | | |
|---|---|---|---|
| 2,962,386 | 11/1960 | Doll et al. | 117/46 CC |
| 3,102,047 | 8/1963 | Rivington | 117/46 CC |
| 3,238,054 | 3/1966 | Bickerdike et al. | 117/46 CC |
| 3,416,944 | 12/1968 | Pirrung et al. | 117/46 CC |
| 3,573,086 | 3/1971 | Lambdin | 117/65.2 |
| 3,723,157 | 3/1973 | Druin | 117/46 CB |
| 3,772,115 | 11/1973 | Carlson et al. | 117/46 CC |

*Primary Examiner*—William D. Martin
*Assistant Examiner*—Janyce A. Bell
*Attorney, Agent, or Firm*—Schiller & Pandiscio

[57] ABSTRACT

A reinforced article is produced by forming a carbon-containing shaped article impregnated with a carbonaceous binder material. The binder is cured and then the shaped article is heated under elevated pressure to carbonize the binder. Heating is in two steps. First the shaped article is heated at a rate of from about 60° to 100°C per hour temperature rise, until a temperature in the range of about 800° to 1000°C, is reached. Then the heating rate is increased to from 100° to 300°C per hour, preferably about 200°C per hour, until the binder is substantially completely carbonized.

6 Claims, No Drawings

METHOD OF MAKING WOUND GRAPHITE CARBON BODY

This invention relates to a method for making carbon or graphite articles, and more particularly to a method for making light weight, high-strength, shaped, carbon-carbon composite articles.

Carbon shaped articles are finding increasing application in industry, due to their properties of corrosion and abrasion resistance and strength, particularly at high temperatures (e.g. 2000°C or higher). Carbon articles may increase in strength as they are heated, up to about 2700°C. This latter property makes such articles somewhat unique inasmuch as many other materials generally weaken as they are heated. As a result, there is a demand for shaped carbon articles for use as hot pressing molds, e.g. for ceramic or refractory metals fabrication, and other high temperature environments.

Current methods of producing shaped carbon articles have disadvantages. One method involves forming a shaped body by extruding or molding a mixture of coke and a carbonaceous binder. The binder is cured, and then the shaped body is heated to a temperature sufficient to carbonize the binder. Such method has the disadvantage that bodies thus formed are relatively dense, and thus are often too heavy for many applications unless the walls of such bodies are made to be relatively thin, in which case they may lack sufficient structural strength for many applications.

Another prior art method involves forming a shaped body by bonding together layers of graphite sheet material. The sheets are stacked onto a mandrel, impregnated with a carbonaceous binder, and the binder cured. Then the stacked sheets are heated to a temperature sufficient to carbonize the binder. Such system requires precise, even application of binder to avoid possible variations in thickness between stacked layers. Any variation of binder thickness may result in internal stress in the resulting body due to uneven rates of expansion of the binder under curing, and uneven rates of contraction under carbonozing conditions. Furthermore, such method is not generally suitable for producing complex shapes.

An attempt to overcome one or more of the foregoing problems is the method described in Rohl et al. U.S. Pat. No. 3,462,289. According to this latter method carbon fibers are formed into a shaped body, and impregnated with a carbonaceous binder. The binder is cured, and the body is then slowly heated to a temperature sufficient to carbonize the binder. According to these patentees, in the carbonizing heating step there may normally be produced a certain volume of volatiles which are out-gassed from the body, leaving behind voids. Such voids may weaken the body. Consequently the body is reimpregnated with additional binder, cured and carbonized for a number of times until a body which is substantially free of voids is obtained. A principal disadvantage of the Rohl et al method is the reqiurement for multiple impregnations, curing and carbonizing cycles, all of which directly increase costs. Furthermore such cycles may require a substantial amount of time, e.g. 3–6 months or more for large bodies, which obviously may be unacceptable from a commercial standpoint. Additionally, the Rohl et al method has heretofore been limited to use with carbon or graphite yarns which are relatively expensive. Furthermore, while a winding angle close to 90° is preferable from strength considerations, such may lead to delaminations in practice.

A principal object of the present invention is, therefore, to provide a light weight, high strength, shaped, carbon-carbon composite article.

Yet another object of the present invention is to provide a method for producing a shaped high strength carbon-carbon composite article which, on the whole, is faster and therefore more economical than prior art methods.

Other objects of the present invention will, in part, be obvious and will, in part, appear hereinafter. The invention accordingly comprises the process including the several steps and the relation of one or more of such steps with respect to each of the others, all of which are exemplified in the following detailed disclosure and the scope of the application of which will be indicated in the claims.

To effect the foregoing and other objects, the invention generally involves forming a carbon-containing fiber material into a shape which is impregnated with a binder material. The binder is cured and then the shape is heated under elevated pressure to carbonize the binder. Heating is in two steps. First the shape is heated gradually, typically at a low rate, e.g. 80°C per hour until a temperature of preferably about 800°C, is reached. The heating rate is then increased, e.g. to about 200°C per hour and continued until the binder is substantially completely carbonized.

The fiber material used in this invention may be any carbon-containing fibrous material. Preferably the fiber material is in a carbonized form, derived from the carbonization of such materials, e.g. as carbon or graphite ribbon, tape, strip or yarn. Especially preferred is monolithic graphite yarn which produces an extremely high strength article. Ordinary rayon or cotton yarn in uncarbonized form, or the like may be used where extremely high strength is not required, and have the advantage of cost.

The fiber material may be formed into a shape by wrapping the fibers in the form of filaments, yarns, tapes, or woven or felted fabrics around a mandrel.

Any suitable binder which will carbonize when heated at elevated temperatures may be utilized in the process of the present invention. For example binders such as phenolic condensation products, urea condensation products, epoxy resins, dextrose and coal tar pitch may be used. Preferred as binder materials are coal tar pitch and furanes.

In practice, the fiber material may be impregnated with binder prior to shaping, following shaping, or the fiber material may be partially impregnated prior to shaping, and impregnation completed following shaping. The order of shaping and impregnating is not particularly important in the instant invention. Preferably, the material is impregnated with binder under pressure.

After shaping, the material preferably is placed under compression to expel excess binder before curing the binder under appropriate conditions. Following curing, the shaped material preferably is machined to fit into a suitable hot pressing mold. Then the shaped material is heated in the mold under pressure to carbonize the binder. As noted previously, heating is in two stages. First the shape is heated at a relative slow rate of temperature rise of from about 60° and 100°C per hour, until a temperature in the range of about 800° to 1000°C, preferably about 800°C is reached, e.g. over about an 8–12 hour period. Heating is then continued at a relatively fast rate of temperature rise in the range of from about 100° to 300°C per hour, preferably about 200°C per hour, until the binder is substantially completely carbonized. Usually carbonizing is substantially complete when a temperature of about 2400°C is reached, e.g. within about 4 to 8 hours. Pressure is maintained at about 500–1000 psi throughout the heatings. The rates of heating are generally a function of the size of the article. Generally, relatively large articles will be heated at slower rates of temperature increase than small articles so that the temperature in the article will be substantially uniform throughout.

An advantage of the present invention is that the entire bake out and carbonizing cycle can usually be completed in a period of less than about 24 hours. Another advantage is that a body may be obtained which is substantially free of voids so that multiple reimpregnations with binder, curing and carbonizing cycles are not required. The present invention thus provides for the first time a fast, economical method of producing light weight, high strength, complex shaped carbon-carbon reinforced articles. Another advantage is that winding angles close to 90° helical angle are now possible without a danger of delamination. Additionally, the finished article produced according to the instant invention may have up to about 80 volume percent of fibers. Typical prior art filament winding techniques seldom achieve more than about 65 volume percent of fibers. This latter property is important since the fibers content is the strength lending element of the composite. Among the most significant advantages is that the technique of the invention appears to increase substantially (e.g. by a factor of 3 or more) the elastic modulus of the fibers, apparently by working them. Finally, the instant invention may be used to advantage with relatively inexpensive materials such as rayon yard and the like.

The following examples illustrate the production of carbon-carbon composites according to the process of this invention. These examples are presented solely for illustration and should not be regarded as limiting the invention.

EXAMPLE I

A cylindrical winding assembly is produced as follows:

Five ply yarn, 720 filaments per ply is dry wound on a 3 inch diameter graphite mandrel, producing a shape approximately 6 inches long. Winding angle is 85°–90° helical throughout the winding. The carbon yarn is kept under tension during the winding, and is clamped so as to maintain the tension on the yarn and prevent it from unwinding. The winding assembly is placed in an autoclave, the autoclave is evacuated to a pressure of about 29 inches of mercury, and the winding assembly is impregnated with an 80/20 mix of 80% solids Monsanto SC 1008 phenolic resin with Quaker Oats "Fapreg P3" furfural alcohol under a 29 inch vacuum. Then the winding assembly is heated to provide an extended cure at a maximum of about 230°C at 100 psi nitrogen.

The resulting assembly is then machined to fit into a hot pressing graphite mold. Standard graphite ring pistons are fitted on the top and bottom, respectively, of the assembly. The inner diameter of the ring pistons is slightly greater than the outer diameter of the mandrel; the outer diameter of the ring pistons is substantially equal to the outer diameter of the machine wound assembly. The assembly is then heated at a rate of about 100°C rise per hour until a temperature of 800° is reached (i.e. in about 8 hours). The heating rate then is increased to about 200°C rise per hour and heating is continued until a temperature of 2400°C is reached (i.e. in about 8 hours additional). Pressure on the assembly is maintained at about 550 psi throughout the heatings.

A carbon-carbon composite cylindrical shape is obtained which has an inside diameter of about 2¼ inches, and a length of about 4½ inches and a density of about 1.4 g./cc.

EXAMPLE II

The purpose of this example is to show how the instant invention can be used to advantage to produce a carbon-carbon composite article directly, from a relatively inexpensive fibrous material. Rayon yarn is chosen as the material.

Commercial multifilament plied rayon yarn is dry wound on a 3 inch diameter cardboard tube, producing a shape approximately 6 inches long. Winding angle is 88°–90° circumferential throughout the winding. The rayon yarn is kept under tension during the winding, and is clamped so as to maintain the tension on the yarn and thereby prevent it from unwinding. A rayon winding assembly results which is placed in a retort and pyrolyzed in an inert atmosphere by slow heating to about 430°C at a rate not more than about 12°C per hour especially in the range from 180° to 260°C. The cardboard tube will shrink at about the same rate preventing the occurrance of disruptive stresses. To convert the carbonized yarn to graphite, the assembly is then heated to around 1480°C. The assembly is then placed in an autoclave which is evacuated to a pressure of about 29 inches of mercurcy, and the rayon wound assembly is impregnated with the same resin-alcohol mixture as in Example I. The rayon wound assembly thus impregnated is then heated to properly cure the impregnant according to standard commercial practise.

The resulting assembly is then machined to fit into a hot pressing graphite mold. Standard graphite ring pistons are fitted on the ends of the assembly. The inner diameter of the ring pistons is slightly greater than the outer diameter of a graphite tube mandrel; the outer diameter of the ring pistons is substantially equal to the outer diameter of the machined wound assembly. The assembly is heated at a rate of about 65°C rise per hour until a temperature of about 800°C is reached (i.e. in about 12 hours). Heating rate is increased to about 200°C rise per hour and heating is continued until a temperature of about 2400°C is reached (i.e. in about 8 hours additional). Pressure on the assembly is maintained at about 1000 psi in the furnace throughout the heatings.

A carbon-carbon composite cylindrical shape is obtained which has an inside diameter of about 2¼ inches, and a length of about 4½ inches, and a density of about 1.4g./cc.

As appears clearly from the foregoing, carbon-carbon composite articles can be produced by a rapid method which does not require reimpregnations, and allows inexpensive materials to be used.

Since certain changes may be made in the above process without departing from the scope of the invention herein involved, it is intended that all matter contained in the above description shall be interpreted in an illustrative and not in a limiting sense.

What is claimed is:

1. Method for producing a carbon-carbon reinforced article comprising:

forming reinforcing, fibrous, carbon-containing material into a shape impregnated with a carbonaceous binder material;

curing said binder material; and carbonizing said binder material in two heating steps in which the temperature of said article is kept substantially uniform throughout and comprising first heating the shape to raise the temperature of said shape at a first rate in the range of from about 60° to 100°C per hour to a temperature in the range of about 800° to 1000°C, and then increasing the rate of heating so as to raise the temperature of said shape at a second rate in the range of from about 100° to 300°C per hour to a temperature in the range of about 2200° to 2400°C, all at elevated pressure.

2. A method as defined in claim 1 wherein said first carbonizing heating step is continued until a temperature of about 800°C is reached.

3. A method as defined in claim 1 wherein said second carbonizing heating step is continued until a temperature of about 2400°C is reached.

4. A method as defined in claim 1 wherein said carbon-containing material comprises a carbonized material selected from carbon and graphite ribbon, tape, strip or yarn.

5. A method as defined in claim 1 including the step of machining said shape prior to carbonizing said binder material.

6. Method for producing carbon-carbon reinforced articles comprising:

forming reinforcing, fibrous, carbon-containing material into a shape impregnated with a carbonaceous binder material;

curing said binder material;

heating said shape at a pressure in the range of from about 500–10000 psi and at a rate of temperature rise in the range of from about 60° to 100°C per hour until a temperature in the range of from about 800° to 1000°C is reached; and increasing the heating rate to a temperature rise in the range of from about 100° to 300°C per hour and continuing heating and maintaining a pressure of from about 500–1000 psi until a temperature in the range of from about 2200° to 2400°C is reached.

* * * * *

UNITED STATES PATENT OFFICE
CERTIFICATE OF CORRECTION

PATENT NO. : 3,917,884
DATED : November 4, 1975
INVENTOR(S) : Paul F. Jahn

It is certified that error appears in the above-identified patent and that said Letters Patent are hereby corrected as shown below:

Column 6, line 16, the number "10,000" should read --1,000--.

Signed and Sealed this tenth Day of February 1976

[SEAL]

Attest:

RUTH C. MASON
Attesting Officer

C. MARSHALL DANN
Commissioner of Patents and Trademarks